United States Patent
Sakamoto et al.

(10) Patent No.: US 12,181,706 B2
(45) Date of Patent: Dec. 31, 2024

(54) MULTI-CORE OPTICAL FIBER AND DESIGN METHOD

(71) Applicant: NIPPON TELEGRAPH AND TELEPHONE CORPORATION, Tokyo (JP)

(72) Inventors: Taiji Sakamoto, Musashino (JP); Kazuhide Nakajima, Musashino (JP); Masaki Wada, Musashino (JP); Shinichi Aozasa, Musashino (JP); Takashi Yamamoto, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 363 days.

(21) Appl. No.: 17/605,758

(22) PCT Filed: Apr. 6, 2020

(86) PCT No.: PCT/JP2020/015442
§ 371 (c)(1),
(2) Date: Oct. 22, 2021

(87) PCT Pub. No.: WO2020/217939
PCT Pub. Date: Oct. 29, 2020

(65) Prior Publication Data
US 2022/0214496 A1     Jul. 7, 2022

(30) Foreign Application Priority Data
Apr. 25, 2019   (JP) .................................. 2019-084500

(51) Int. Cl.
*G02B 6/02*    (2006.01)
*G02B 27/00*   (2006.01)

(52) U.S. Cl.
CPC ..... *G02B 6/02042* (2013.01); *G02B 27/0012* (2013.01)

(58) Field of Classification Search
None
See application file for complete search history.

(56) References Cited

U.S. PATENT DOCUMENTS

2015/0016795 A1    1/2015  Sasaoka et al.
2017/0102501 A1*   4/2017  Hayashi ................ G02B 6/268
(Continued)

FOREIGN PATENT DOCUMENTS

JP    2017-72818 A     4/2017
WO    WO-2014/109395 A1  7/2014

OTHER PUBLICATIONS

H. Takara et al., "1.01-Pb/s (12 SDM/222 WDM/456 Gb/s) Crosstalk-managed Transmission with 91.4-b/s/Hz Aggregate Spectral Efficiency," in ECOC2012, paper Th.3.C.1 (2012).
(Continued)

*Primary Examiner* — Chris H Chu

(57) ABSTRACT

An object is to provide a multi-core configuration for acquiring a random mode coupling in a case of an arbitrary core refractive index.
A multi-core optical fiber according to the present invention is an optical fiber in which two or more core regions are arranged in a clad region having a refractive index at a minimum core interval Λ smaller than a refractive index of the cores, a configuration of the cores is that including one propagation mode, and the core configuration and the core interval are adjusted so that an inter-mode coupling coefficient between adjacent cores is within a range from 0.73 to 120 m$^{-1}$.

6 Claims, 13 Drawing Sheets

(56) References Cited

U.S. PATENT DOCUMENTS

| | | | |
|---|---|---|---|
| 2019/0207358 A1* | 7/2019 | Hasegawa | H01S 3/094042 |
| 2021/0003773 A1* | 1/2021 | Hayashi | G02B 6/028 |
| 2021/0003774 A1* | 1/2021 | Hayashi | G02B 6/03627 |

OTHER PUBLICATIONS

T. Sakamoto et al., "Differential Mode Delay Managed Transmission Line for WDM-MIMO System Using Multi-Step Index Fiber," J. Lightwave Technol. vol. 30, pp. 2783-2787 (2012).

Y. Sasaki et al., "Large-effective-area uncoupled few-mode multi-core fiber," ECOC2012, paper Tu.1.F.3 (2012).

T. Ohara et al., "Over-1000-Channel Ultradense WDM Transmission With Supercontinuum Multicarrier Source," IEEE J. Lightw. Technol., vol. 24, pp. 2311-2317 (2006).

T. Sakamoto, T. Mori, M. Wada, T. Yamamoto, F. Yamamoto, "Coupled Multicore Fiber Design With Low Intercore Differential Mode Delay for High-Density Space Division Multiplexing," J. Lightw. Technol., vol. 33, No. 6, pp. 1175,1181, (2015).

T. Sakamoto, T. Mori, M. Wada, T. Yamamoto, and F. Yamamoto, "Fiber twisting and bending induced mode conversion characteristics in coupled multi-core fibre," ECOC, paper P.1.02 (2015).

ITU-T Recommendation G.650.1 (Mar. 2018).

Y. Katsuyama, M. Tokuda, N. Uchida, and M. Nakahara, "New method for measuring the V-value of a single-mode optical fiber," Electron. Lett., vol. 12, pp. 669-670, Dec. 1976.

N. Okada et al., "Study on bending strain of SZ slotted core cable with fiber ribbons," IWCS1999, pp. 112-117 (1999).

T. Fackerell et all., "Modelling optical fibre cable," Materials Information and communication technology, pp. 92-102 (1996).

Katsunari Okamoto, "Theory of optical waveguides" Corona Publishing Co., Ltd., dated Oct. 20, 1992.

R. Ryf, N. K. Fontaine, B. Guan, R. J. Essiambre, S. Randel, A. H. Gnauck, S. Chandrasekhar, A. Adamiecki, G. Raybon, B, Ercan, R. P. Scott, S. J. Ben Yoo, T. Hayashi, T. Nagashima, and T. Sasaki, "1705-km transmission over coupled-core fibre supporting 6 spatial modes," ECOC, paper PD. 3.2 (2014).

* cited by examiner

TABLE 1

| TWISTING RATE ($\pi$ rad/m) | CORE PITCH LOWER LIMIT ($\mu$m) | CORE PITCH UPPER LIMIT ($\mu$m) | COUPLING COEFFICIENT UPPER LIMIT (m$^{-1}$) | COUPLING COEFFICIENT LOWER LIMIT (m$^{-1}$) |
|---|---|---|---|---|
| 4 | 16.2 | 31.9 | 134.8807 | 0.493475 |
| 5 | 16 | 33.8 | 143.6855 | 0.254538 |
| 6 | 16 | 30.8 | 143.6855 | 0.729698 |
| 7 | 15.8 | 30.8 | 156.4609 | 0.729698 |
| 8 | 15.2 | 30.8 | 194.7871 | 0.729698 |
| 10 | 15 | 30.8 | 207.5625 | 0.729698 |

Fig. 11

TABLE 2

| V | A | B |
|---|---|---|
| 1.95 | 1.9892 | −1.3138 |
| 2 | 2.2262 | −1.3733 |
| 2.05 | 2.4885 | −1.4328 |
| 2.1 | 2.7758 | −1.4921 |
| 2.15 | 3.0919 | −1.5514 |

Fig. 12

MULTI-CORE OPTICAL FIBER AND DESIGN METHOD

CROSS-REFERENCE TO RELATED APPLICATIONS

This application is a 371 U.S. National Phase of International Application No. PCT/JP2020/015442 filed on Apr. 6, 2020, which claims priority to Japanese Application No. 2019-084500 filed on Apr. 25, 2019. The entire disclosures of the above applications are incorporated herein by reference.

TECHNICAL FIELD

The present disclosure relates to a multi-core optical fiber.

BACKGROUND ART

In an optical fiber communication system, transmission capacity is limited by non-linear effects or a fiber fuse generated in optical fibers. In order to relax the limitations, spatial multiplexing technologies are under study, such as parallel transmission using a multi-core fiber containing a plurality of cores in one optical fiber (Non Patent Literature (NPL) 1), mode-multiplexing transmission using a multi-mode fiber in which a plurality of propagation modes are present in a core (NPL 2), and a few-mode multi-core fiber combining multi-core and mode-multiplexing (NPL 3).

CITATION LIST

Non Patent Literature

NPL 1: H. Takara et al., "1.01-Pb/s (12 SDM/222 WDM/456 Gb/s) Crosstalk-managed Transmission with 91.4-b/s/Hz Aggregate Spectral Efficiency," in ECOC2012, paper Th.3.C.1 (2012)
NPL 2: T. Sakamoto et al., "Differential Mode Delay Managed Transmission Line for WDM-MIMO System Using Multi-Step Index Fiber," J. Lightwave Technol. vol. 30, pp. 2783-2787 (2012).
NPL 3: Y. Sasaki et al., "Large-effective-area uncoupled few-mode multi-core fiber," ECOC2012, paper Tu.1.F.3 (2012).
NPL 4: T. Ohara et al., "Over-1000-Channel Ultradense WDM Transmission With Supercontinuum Multicarrier Source," IEEE J. Lightw. Technol., vol. 24, pp. 2311-2317 (2006)
NPL 5: T. Sakamoto, T. Mori, M. Wada, T. Yamamoto, F. Yamamoto, "Coupled Multicore Fiber Design With Low Intercore Differential Mode Delay for High-Density Space Division Multiplexing," J. Lightw. Technol., vol. 33, no. 6, pp. 1175, 1181, (2015)
NPL 6: T. Sakamoto, T. Mori, M. Wada, T. Yamamoto, and F Yamamoto, "Fiber twisting and bending induced mode conversion characteristics in coupled multi-core fibre," ECOC, paper P. 1.02 (2015).
NPL 7: ITU-T Recommendation G.650.1
NPL 8: Y. Katsuyama, M. Tokuda, N. Uchida, and M. Nakahara, "New method for measuring the V-value of a single-mode optical fiber," Electron. Lett., vol. 12, pp. 669-670, December. 1976.
NPL 9: N. Okada et al., "Study on bending strain of SZ slotted core cable with fiber ribbons," IWCS1999, pp. 112-117 (1999)
NPL 10: T. Fackerell et all., "Modelling optical fibre cable," Materials Information and communication technology, pp. 92-102
NPL 11: Katsunari Okamoto, "Theory of optical waveguides" Corona Publishing Co., Ltd.
NPL 12: R. Ryf, N. K. Fontaine, B. Guan, R.-J. Essiambre, S. Randel, A. H. Gnauck, S. Chandrasekhar, A. Adamiecki, G. Raybon, B, Ercan, R. P. Scott, S. J. Ben Yoo, T. Hayashi, T. Nagashima, and T. Sasaki, "1705-km transmission over coupled-core fibre supporting 6 spatial modes," ECOC, paper PD. 3.2 (2014).

SUMMARY OF THE INVENTION

Technical Problem

In transmission using a multi-core fiber, if inter-core crosstalk occurs, a signal quality deteriorates, and thus, a certain distance should be placed between the cores to suppress the crosstalk. In general, in order to ensure a sufficient transmission quality in an optical communication system, a power penalty is desirably 1 dB or less, and for attaining this goal, the crosstalk should be −26 dB or less as described in NPL 1 or 4.

On the other hand, if the MIMO technology is used, the crosstalk can be compensated at a reception end, and even if an inter-core distance is small and the crosstalk is −26 dB or more, the power penalty can be less than 1 dB by signal processing, and thus, a space use efficiency can be improved. In applying the MIMO technology, however, if a differential modal group delay (DMD) between a plurality of signal lights generated in a transmission line is large, an impulse response width of the transmission line is large, which leads to signal processing increase.

In general, as described in NPL 2, the DMD between a plurality of modes propagating the same core can be reduced by controlling a refractive index distribution of the optical fiber.

On the other hand, in the multi-core fiber also, the modes propagating in different cores can be taken as different modes, and thus, the DMD can be similarly defined. A relationship between an amount of the inter-core crosstalk and the DMD is clarified in NPL 5, and thus, it is known that reduction in the inter-core distance increases the DMD. Specifically, it is known that even if the inter-core crosstalk is allowed, in order not to increase the DMD, a lower limit of the inter-core distance is present and there is a limitation on the improvement of the space use efficiency.

However, as described in NPL 5, the impulse response width of the optical fiber is smaller than the DMD in some cases. This is because the propagating modes distributively couple each other in a propagation direction, so that a group velocity averaging effect is obtained.

NPL 6 describes that the modes randomly coupling in this manner reduce a signal processing load at the reception end, and it is known that fiber bending and twisting greatly affect the coupling.

However, NPL 6 discloses only the description of a case that the refractive index distribution of the core (core radius or relative index difference) has a specific value. In other words, the above non patent literatures do not disclose an arbitrary multi-core configuration for acquiring a random mode coupling (core refractive index distribution, inter-core distance, or the like), and hence there is a problem what configuration a coupling type multi-core fiber has as a communication fiber is still unclear.

As such, in order to solve the above problem, the present invention has an object to provide a multi-core optical fiber having a multi-core configuration for acquiring a random mode coupling and to provide a design method thereof.

Means for Solving the Problem

The present invention defines an inter-mode coupling coefficient for acquiring a desired mode coupling, and adjusts a core radius, a relative index difference, a core interval, and other multi-core fiber configurations so that the inter-mode coupling coefficient is acquired.

Specifically, a multi-core optical fiber according to the present invention includes two or more cores, wherein each of the cores has one propagation mode in a wavelength $\lambda$, of a desired communication wavelength band, and an inter-mode coupling coefficient $\kappa$ between adjacent cores which is a minimum interval among the cores is $\kappa_{min}$ or more and $\kappa_{max}$ or less, where $\kappa_{min}=0.73$ m$^{-1}$ and $\kappa_{max}=120$ m$^{-1}$. In the multi core optical fiber, the inter mode coupling coefficient of $-30$ dB/m or more is acquired. Note that the inter-mode coupling coefficient of $-20$ dB/m or more is acquired if $\kappa_{min}=2.2$ m$^{-1}$ and $\kappa_{max}=98$ m$^{-1}$, and the inter-mode coupling coefficient of $-10$ dB/m or more is acquired if $\kappa_{min}=7.3$ m$^{-1}$ and $\kappa_{max}=77.1$ m$^{-1}$.

In order to acquire the above inter-mode coupling coefficient, a minimum core interval A that is an interval between the adjacent cores is in a range satisfying Math. C1,

[Math. C1]

$$\frac{a}{B}\ln\left(\frac{\kappa_{min}a}{A\sqrt{\Delta}}\right) > \Lambda > \frac{a}{B}\ln\left(\frac{\kappa_{max}a}{A\sqrt{\Delta}}\right) \quad (C1)$$

$$A = -8.7812 + 5.51V$$

$$B = 1.0027 - 1.188V$$

$$V = a\frac{2\pi}{\lambda}n_1\sqrt{2\Delta}$$

where a represents a radius of the cores, A represents a relative index difference of the cores and, $n_1$ represents a refractive index of the cores.

In order to satisfy optical characteristics of ITU-T G.652, a cut-off wavelength is 1.26 μm or less, a bending loss is 0.1 dB/100 turn or less at a wavelength of 1625 nm and a bend radius of 30 mm, and a mode field diameter is 8.2 μm or more and 9.6 μm or less at a wavelength of 1310 nm.

The inter-mode coupling coefficient of such a multi-core optical fiber can be acquired by a design method described below. A design method according to the present invention is a design method of a multi-core optical fiber, the multi-core optical fiber including two or more cores with a step type refractive index distribution, the design method including: with a bend radius of 140 mm and a twisting rate of 4πrad/m, calculating, from a core configuration in which a desired inter-mode coupling occurs between adjacent cores which a core interval is minimum at an arbitrary wavelength $\lambda$, an inter-mode coupling coefficient $\kappa$ between the adjacent cores by using Math. C3 while varying a relative index difference $\Delta$ of the cores and keeping a normalized frequency V in Math. C2 a constant value at the arbitrary wavelength $\lambda$, to acquire a first inter-mode coupling coefficient range; with a bend radius of 140 mm and a twisting rate of 4πrad/m, calculating, from a core configuration in which a desired inter-mode coupling occurs at the arbitrary wavelength $\lambda$, the inter-mode coupling coefficient $\kappa$ between the adjacent cores by using Math. C3 while keeping the relative index difference $\Delta$ of the cores a constant value and varying a normalized frequency V at the arbitrary wavelength $\lambda$, to acquire a second inter-mode coupling coefficient range; with a bend radius of 140 mm, calculating, from a core configuration in which a desired inter-mode coupling occurs at the arbitrary wavelength $\lambda$, the inter-mode coupling coefficient $\kappa$ between the adjacent cores by using Math. C3 while keeping a radius a of the cores and the relative index difference $\Delta$ constant values and varying a twisting rate, to acquire a third inter-mode coupling coefficient range; and determining inter-mode coupling coefficients $\kappa_c$ of the multi-core optical fiber within a range included in all of the first inter-mode coupling coefficient range, the second inter-mode coupling coefficient range, and the third inter-mode coupling coefficient range,

[Math. C2]

$$V = a\frac{2\pi}{\lambda}n_1\sqrt{2\Delta} \quad (C2)$$

$$V^2 = u^2 + w^2$$

where n1 represents a refractive index of the cores,

[Math. C3]

$$\kappa = \frac{\sqrt{\Delta}}{a}\frac{u^2}{V^3 K_1^2(w)}\left(\frac{\pi a}{w\Lambda}\right)^{\frac{1}{2}}\exp\left(-\frac{w}{a}\Lambda\right) \quad (C3)$$

where a represents a radius of a core, $\Delta$ represents a relative index difference, u represents a normalized lateral propagation constant, w represents a normalized lateral attenuation constant, $\Lambda$ represents a core interval, V represents a normalized frequency, and $K_1^2(W)$ represents a modified Bessel function of a second kind.

Further, in the design method according to the present invention, a minimum core interval $\Lambda$ that is the interval between the adjacent cores is calculated using Math. C1.

Effects of the Invention

The present invention can clarify a multi-core fiber configuration in which the modes are strongly coupled with each other for an arbitrary core profile, so that the impulse response width of the fiber can be reduced. Accordingly, the present invention can provide a multi-core optical fiber having a multi-core configuration for acquiring a random mode coupling and a design method thereof.

In the multi-core optical fiber according to the present invention, more cores can be arranged in a smaller area, and thus, an effect is obtained that a degree of core multiplexing is improved and transmission capacity is increased. In the multi-core optical fiber according to the present invention, the differential modal group delay of the propagating modes is small, and thus, effect is obtained that a calculation load is small in MIMO processing that compensates the inter-modal crosstalk at the reception end. In the multi-core optical fiber according to the present invention, in a case that a loss difference occurs between the modes/cores at a connection point or the like, an effect is obtained that the loss difference is averaged in the transmission line and the transmission quality is improved.

BRIEF DESCRIPTION OF DRAWINGS

FIG. 11 is Table 1 illustrating a result of calculating an upper limit and lower limit of a core pitch and an upper limit and lower limit of a mode coupling coefficient for acquiring the mode coupling of −30 dB/m or more, with respect to a twisting rate.

FIG. 12 is Table 2 illustrating a relationship between the V value, the coefficient A, and the coefficient B.

DESCRIPTION OF EMBODIMENTS

Embodiments of the present invention will be described with reference to the accompanying drawings. The embodiments described below are examples of the present invention and the present invention is not limited to the embodiments described below. Note that components with the same reference signs in the specification and the drawings are assumed to be the same components.

First Embodiment

Figure 1:
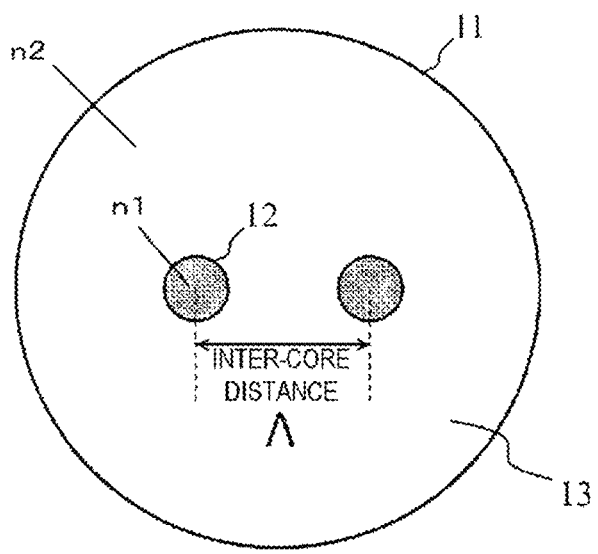
FIG. 1 is a schematic diagram illustrating a cross-sectional structure of a multi-core fiber.

FIG. 1 is a cross-sectional view of a multi-core optical fiber 11 with two cores. There are a core region 12 having a refractive index of n1 and a clad region 13 having a refractive index of n2, where n1>n2.

In the configuration of FIG. 1, the condition of n1>n2 can be attained by using materials for those regions, such as pure quartz glass, or quartz glass to which impurities that increase the refractive index are added such as germanium (Ge), aluminum (Al), or phosphorus (P) or impurities that decrease the refractive index such as fluorine (F) or boron (B). An inter-core distance is represented by $\Lambda$.

In designing the coupling type multi-core fiber, as for a bend radius, it is reasonable to use the bend radius of 140 mm for calculation to cable the optical fiber and install the cable because it is meant that a bend of the bend radius of 140 mm is effectively generated in the cable as in the definition that an optical fiber strand to which a bend of the bend radius of 140 mm is imparted is used as an alternative instead of using a cable sample in measuring a cut-off wavelength in ITU-T (see NPLs 7 and 8).

The optical fiber twisting is thought to be generated in producing the optical fiber, and the optical fiber not twisted at all is generally unrealistic. As described in NPLs 9 and 10, the optical fibers are typically twisted to have a helical structure in the cable, and an estimation of 500 mm or less leads to no problem because of the descriptions of twist pitches of 79 mm and 500 mm, and thus, it is only required that the design use $4\pi$rad/m or more.

Note that a relationship between a twist pitch P and a twisting rate $\gamma$ is represented by $\gamma = 2 \times \pi / P$ (rad/m).

Figure 2:
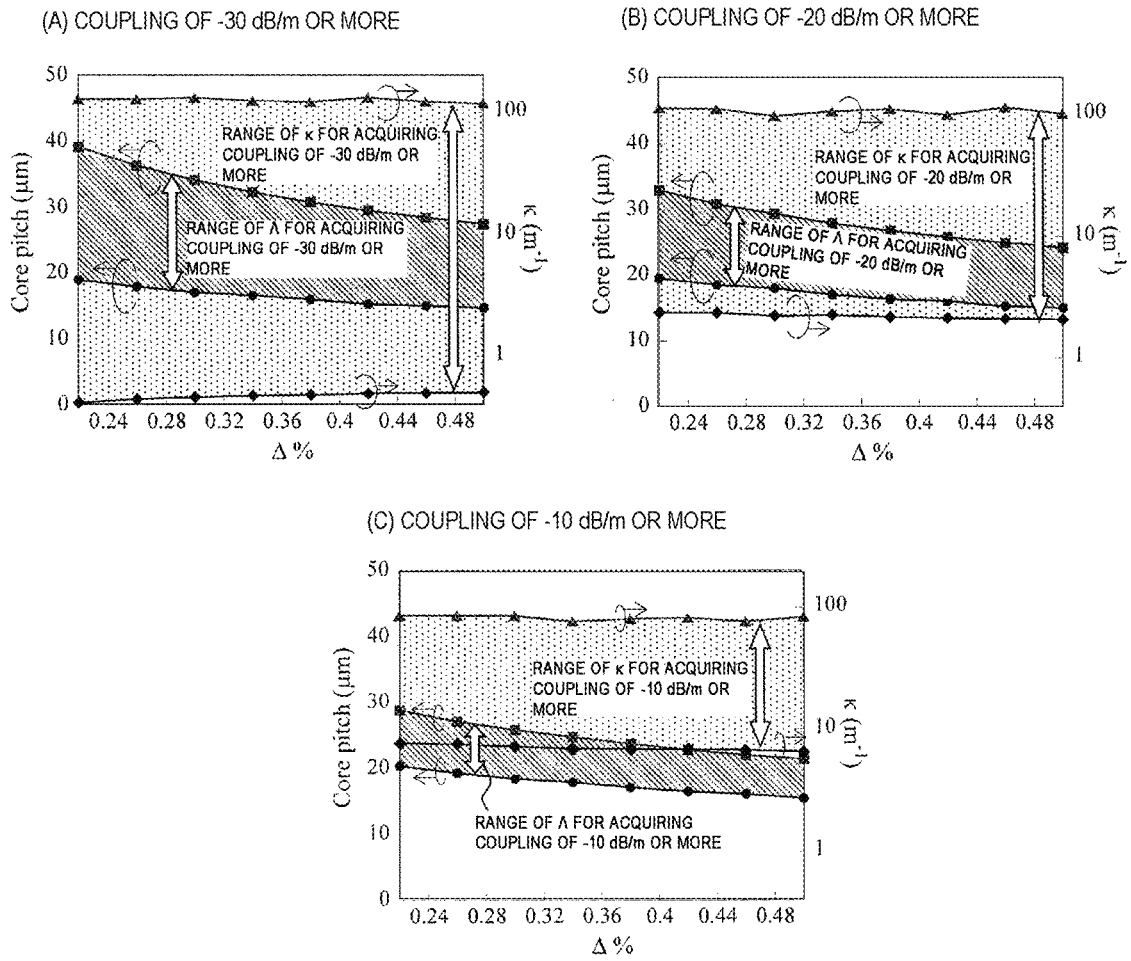
FIG. 2 is a diagram illustrating a core interval $\Lambda$ and a mode coupling coefficient $\kappa$ for acquiring the amounts of inter-mode coupling of (A)−30 dB/m or more, (B)−20 dB/m or more, and (C) −10 dB/m or more when a V value of a core is made constant and a relative index difference $\Delta$ of the core is varied.

Here, FIG. 2 illustrates the core interval $\Lambda$ where an inter-mode coupling of (A) −30 dB/m or more, (B) −20 dB/m or more, or (C) −10 dB/m or more occurs, and a coupling coefficient $\kappa$ calculated from a core configuration for acquiring the inter-mode coupling, when the bend radius is 140 mm and the twisting rate is $4\pi$rad/m in the two-core fiber. A wavelength is assumed to be 1550 nm. Hereinafter, a coupling of −30 dB/km is referred to as a random coupling. Note that the horizontal axis represents a relative index difference $\Delta$ of the core, assuming a step type core in which a core radius a is adjusted so that the V value is 2.162.

Note that V represents a normalized frequency, and

[Math. 1]

$$V = a\frac{2\pi}{\lambda}n_1\sqrt{2\Delta} \quad (1)$$
$$V^2 = u^2 + w^2.$$

Here, n1 represents the refractive index of the core (specifically, see NPL 11). In addition, u represents a normalized lateral propagation constant, and w represents a normalized lateral attenuation constant.

Although in a core of a general single-mode fiber (core radius is 4.4 µm and relative index difference $\Delta$=0.35%), the V value is 2.162, and thus, V=2.162 is used as the V value in a standard single-mode core, another value may be used.

Here, calculation of the coupling coefficient $\kappa$ generally uses an equation below:

[Math. 2]

$$K = \frac{\omega\varepsilon_0 \int\int_{-\infty}^{\infty}(N^2 - N_2^2)E_1 \cdot E_2 dxdy}{4P} \quad (2)$$

where $\omega$ represents an angular frequency in a vacuum, $\varepsilon_0$ represents a dielectric constant in a vacuum, E1 and E2 represent electrical field distributions of a core mode guided in each core and a core mode guided in an adjacent core, respectively, N represents a refractive index distribution of a multi-core fiber, and N2 represents a refractive index distribution by assuming that only one of the cores exists.

Note that in a case that the refractive index of the core is a step type, the coupling coefficient is determined by the following:

[Math. 3]

$$\kappa = \frac{\sqrt{\Delta}}{a} \frac{u^2}{V^3 K_1^2(w)} \left(\frac{\pi a}{w\Lambda}\right)^{\frac{1}{2}} \exp\left(-\frac{w}{a}\Lambda\right) \quad (3)$$

where a represents the radius of the core, Δ represents a relative index difference, u represents a normalized lateral propagation constant, w represents a normalized lateral attenuation constant, Λ represents a core interval, V represents a normalized frequency, and $K_1^2(W)$ represents a modified Bessel function of the second kind.

Here, a description is given to describe that the coupling coefficient in Math. 3 can be also applied to a multi-core optical fiber with N cores. The mode coupling coefficient is defined as a value between two cores, and thus, for a multi-core configuration with N cores (N is an integer of 3 or more) also, a mode coupling coefficient between any two cores can be calculated. Accordingly, the present invention can be applied to any number of cores. However, in the present invention characterized by a desired amount of mode coupling between adjacent cores, it is only required that conditions described below be satisfied between the adjacent cores which are the closest in distance.

As illustrated in FIG. 2, a maximum value and a minimum value of the core pitch for acquiring the random coupling change depending on A of the core. On the other hand, the coupling coefficient κ for acquiring the random coupling is in a range from 0.5 to 120 m⁻¹ independently from Δ of the core.

Note that in a case that the mode coupling is −20 dB/m, it is possible and more desirable to further reduce the impulse response width as described later. In this case, as illustrated in FIG. 2(B), it is only required that the coupling coefficient κ be in a range from 2.0 to 98 m⁻¹ independently from Δ of the core.

Note that in a case that the mode coupling is −10 dB/m, it is possible and more desirable to further reduce the impulse response width. In this case, as illustrated in FIG. 2(C), it is only required that the coupling coefficient κ be in a range from 6.6 to 77.1 m⁻¹ independently from Δ of the core.

Figure 3:
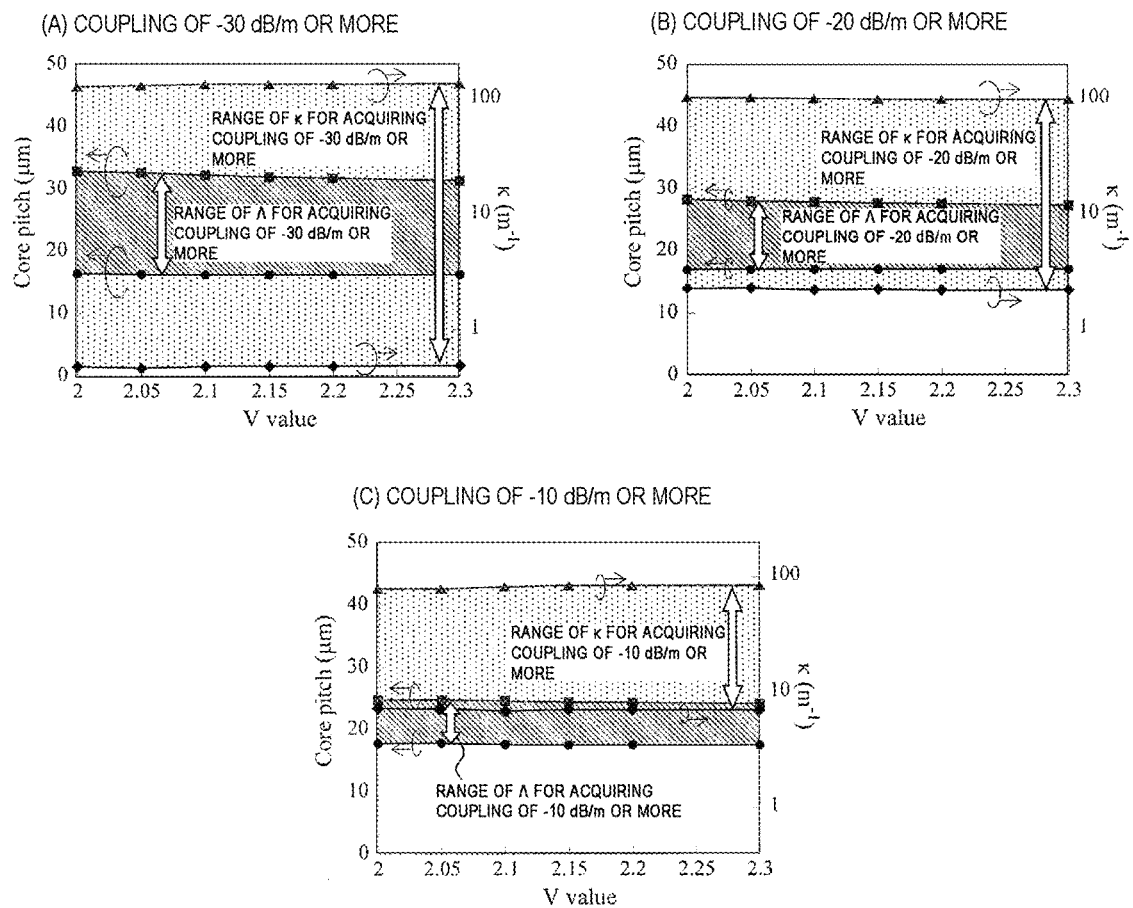
FIG. 3 is a diagram illustrating the core interval $\Lambda$ and the mode coupling coefficient $\kappa$ for acquiring the amounts of inter-mode coupling of (A) −30 dB/m or more, (B) −20 dB/m or more, and (C) −10 dB/m or more when the relative index difference $\Delta$ of the core is made constant and the V value of the core is made is varied.

FIG. 3 illustrates the core interval Λ where an inter-mode coupling of (A) −30 dB/m or more, (B) −20 dB/m or more, or (C) −10 dB/m or more occurs, and a coupling coefficient κ calculated from a core configuration for acquiring the inter-mode coupling with the V value being varied, when the bend radius is 140 mm and the twisting rate is 4πrad/m in the two-core fiber. A wavelength is assumed to be 1550 nm. In this calculation, the relative index difference Δ is assumed to be 0.35% and constant. By varying the V value in a range from 2 to 2.3, a normal single-mode fiber core configuration is almost covered. Note that the V value is expressed by equations below, and thus, the V value can be varied by changing parameters included in the equations below.

$v^2 = u^2 + w^2$ $u = a\sqrt{(k^2 n_1^2 - \beta^2)}$ $w = a\sqrt{(\beta^2 - k^2 n_0^2)}$ [Math. 4]

where $n_0$ represents a refractive index of a clad, β represents a propagation constant of a propagation mode (determined by various optical fiber waveguide analyses), and k=2π/λ.

As illustrated in FIG. 3(A), it is found that the coupling coefficient κ for generating the random coupling is in a range from 0.5 to 130 m⁻¹ independently from the V value.

Note that in a case that the mode coupling is −20 dB/m, it is possible and more desirable to further reduce the impulse response width as described later. In this case, as illustrated in FIG. 3(B), it is only required that the coupling coefficient κ be in a range from 2.2 to 100 m⁻¹ independently from the V value.

Note that in a case that the mode coupling is −10 dB/m, it is possible and more desirable to further reduce the impulse response width. In this case, as illustrated in FIG. 3(C), it is only required that the coupling coefficient κ be in a range from 7.3 to 79.2 m⁻¹ independently from the V value.

In other words, in consideration of both FIGS. 2 and 3, in order to acquire the random coupling (the inter-mode coupling is −30 dB/m), it is only required that the coupling coefficient κ be in a range from 0.5 to 120 m⁻¹ even if the core has any configuration.

More desirably, in order to acquire a stronger random coupling (the inter-mode coupling is −20 dB/m), it is only required that the coupling coefficient κ be in a range from 2.2 to 98 m⁻¹ even if the core has any configuration.

More desirably, in order to acquire a stronger random coupling (the inter-mode coupling is −10 dB/m), it is only required that the coupling coefficient κ be in a range from 7.3 to 77.1 m⁻¹ even if the core has any configuration.

Figure 4:
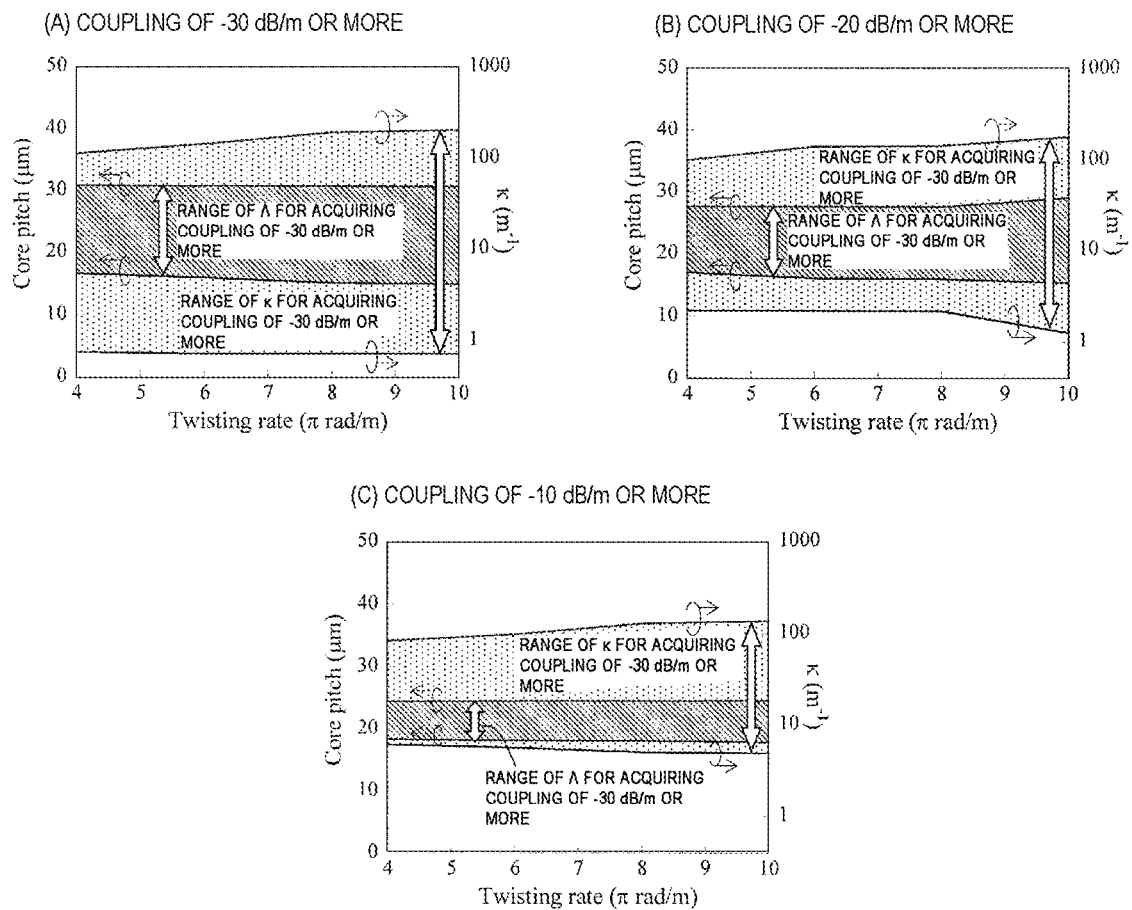
FIG. 4 is a diagram illustrating the core interval $\Lambda$ and the mode coupling coefficient $\kappa$ for acquiring the amounts of inter-mode coupling of (A) −30 dB/m or more, (B) −20 dB/m or more, and (C) −10 dB/m or more when a radius a and the relative index difference $\Delta$ of the core are made constant, and a twisting rate is varied.

Here, the ranges of the random coupling described above are known to change depending on the twisting rate of the optical fiber. FIG. 4 illustrates the core interval Λ where an inter-mode coupling of (A) −30 dB/m or more, (B) −20 dB/m or more, or (C) −10 dB/m or more with respect to the twisting rate occurs, and a coupling coefficient κ calculated from a core configuration for acquiring the inter-mode coupling. Note that the core radius a is assumed to be 4.4 μm, and the relative index difference Δ is assumed to be 0.35%.

As can be seen from FIG. 4, the range of the core pitch Λ where the random coupling occurs is constant independently from the twisting rate. The range of the coupling coefficient κ where the random coupling occurs slightly increases as the twisting rate increases. In consideration of a twisting cycle being 4πrad/m or more, it is only required that the coupling coefficient κ for acquiring the random coupling be in a range from 0.73 to 120 m⁻¹. Note that details of data in FIG. 4(A) are illustrated in Table 1 in FIG. 11. In consideration of core configuration dependency illustrated in FIGS. 2(A) and 3(A) or the like, it is only required that the coupling coefficient κ be in a range from 0.73 to 120 m⁻¹.

Note that in a case that the mode coupling is −20 dB/m, it is possible and more desirable to further reduce the impulse response width as described later. In this case, as illustrated in FIG. 4(B), it is only required that the coupling coefficient κ be in a range from 2.2 to 100 m⁻¹. In consideration of core configuration dependency illustrated in FIGS. 2(B) and 3(B) or the like, it is only required that the coupling coefficient κ be in a range from 2.2 to 98 m⁻¹.

Note that in a case that the mode coupling is −10 dB/m, it is possible and more desirable to further reduce the impulse response width. In this case, as illustrated in FIG. 4(C), it is only required that the coupling coefficient κ be in a range from 6.6 to 84 m⁻¹. In consideration of core configuration dependency illustrated in FIGS. 2(C) and 3(C) or the like, it is only required that the coupling coefficient κ be in a range from 7.3 to 77.1 m⁻¹.

According to the above study, by setting the core interval Λ for generating the coupling coefficient described above, the multi-core optical fiber generating the random coupling independently from the core interval can be designed.

Second Embodiment

The first embodiment describes that the core interval required for acquiring the random coupling changes depending on the core configuration such as A, but the coupling coefficient κ required for acquiring the random coupling is constant. Here, according to FIG. 4.16 in NPL 11, a relationship between $a\kappa/\sqrt{\Delta}$ and $\Lambda/a$ including the coupling coefficient κ can be described using a standardized frequency V as a function, and can be expressed as below using constants A and B.

[Math. 5]

$$\frac{a\kappa_c}{\sqrt{\Delta}} = A\exp\left(B\frac{\Lambda}{a}\right) \quad (5)$$

Figure 5:
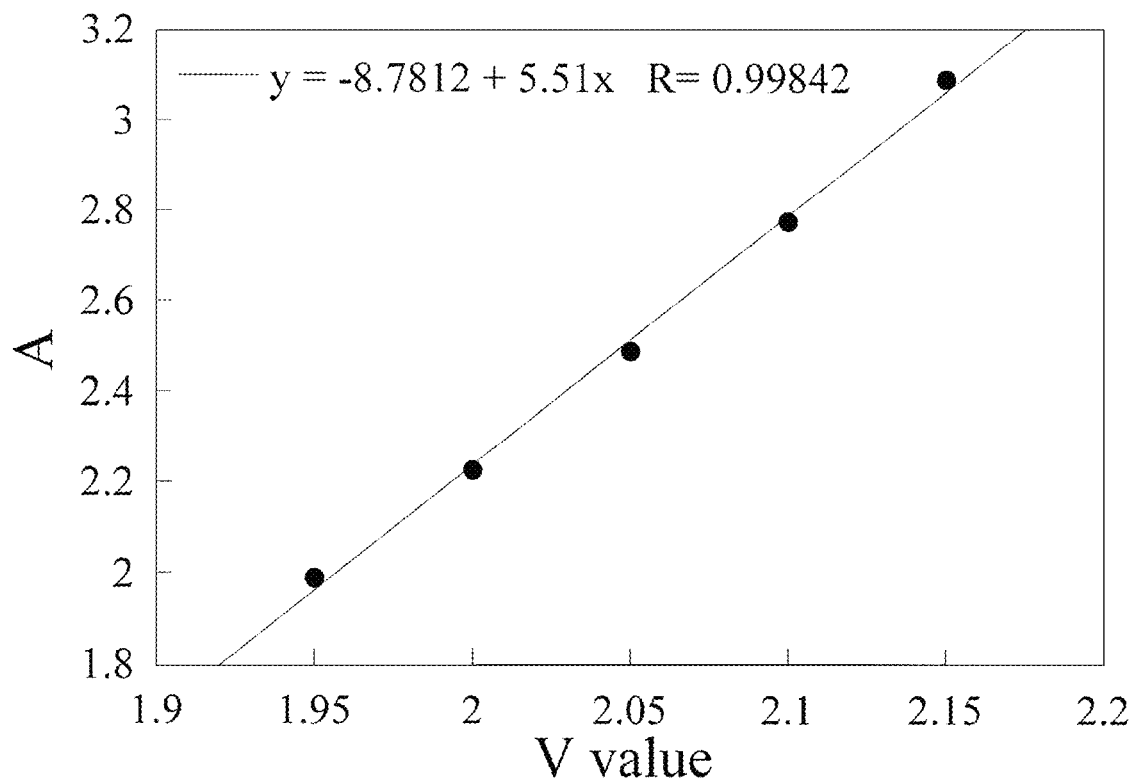
FIG. 5 is a diagram illustrating a result of calculating a relationship between the V value and a coefficient A.
Figure 6:
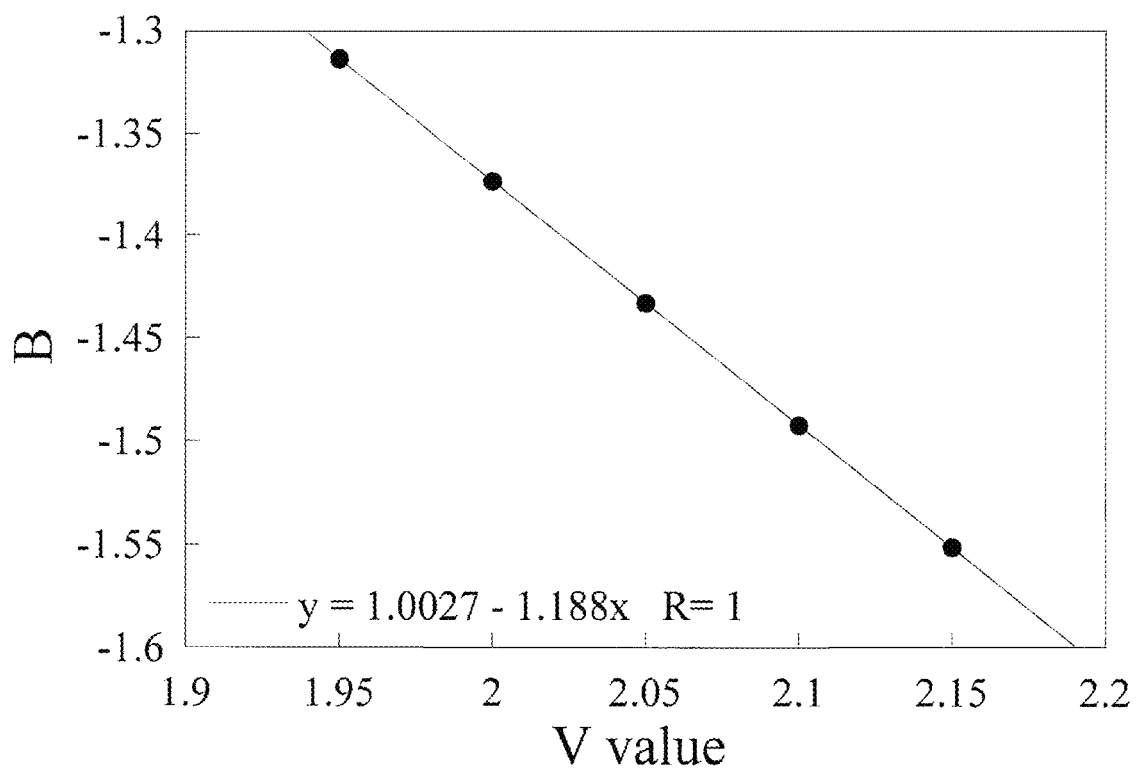
FIG. 6 is a diagram illustrating a result of calculating a relationship between the V value and a coefficient B.

Here, assuming the step type core, variations in A and B for the V value are calculated and values are empirically found to give Table 2 in FIG. 12. Results of deriving the relationship between A and B, and the V value from Table 2 are illustrated in FIGS. 5 and 6. From FIGS. 5 and 6, $$A = f(V) = -8.7812 + 5.51V$$

$$B = f(V) = 1.0027 - 1.188V$$

κ required for the random coupling is κc. For example, when the mode coupling of −30 dB/m or more is acquired, $0.73 < \kappa c < 120$ (m$^{-1}$) as described in the first embodiment. Here, a range of κc is $\kappa_{min} < \kappa c < \kappa_{max}$. For any step type core configuration by substituting the V value of the core, the core radius a, the relative index difference Δ, and xc into Math. 4, the core interval for acquiring the random coupling can be determined. In other words, it is only required that the core interval Λ satisfy the following.

[Math. 6]

$$\frac{a}{B}\ln\left(\frac{\kappa_{min} \cdot a}{A\sqrt{\Delta}}\right) > \Lambda > \frac{a}{B}\ln\left(\frac{\kappa_{max} \cdot a}{A\sqrt{\Delta}}\right) \quad (6)$$

For example, in acquiring the mode coupling of −30 dB/m or more, the following relationship is only required.

[Math. 6 − 1]

$$\frac{a}{B}\ln\left(\frac{0.73a}{A\sqrt{\Delta}}\right) > \Lambda > \frac{a}{B}\ln\left(\frac{134.9a}{A\sqrt{\Delta}}\right) \quad (6-1)$$

Third Embodiment

Figure 7:
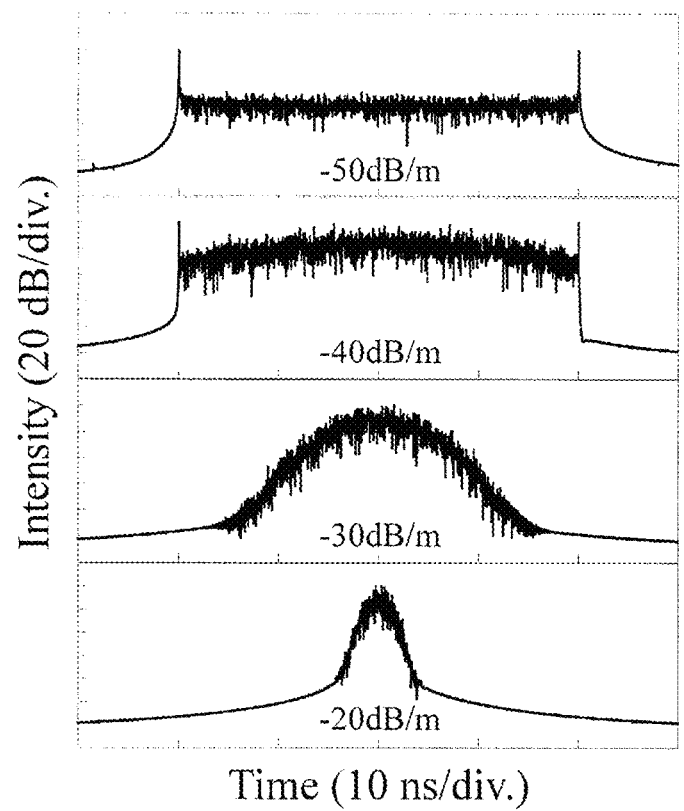
FIG. 7 is a diagram illustrating a relationship between the amount of inter-mode coupling and an impulse response.

Here, what coupling amount gives the random coupling to reduce the impulse response width is calculated. In consideration of a relay zone interposed between optical amplifiers being generally 40 km or more, a result of calculating an impulse response shape when a transmission distance is 40 km and the coupling amount is varied is illustrated in FIG. 7. The DMD between the modes is assumed to be 1 ns/km, for convenience.

At −50 dB/m, a pulse indicating a large intensity is present on both ends, and a width of the pulse is 40 ns the same as of an accumulated DMD (1 ns/km×40 km). In the case of −40 dB/m, although the pulse intensity on both ends decreases, the impulse response width is the same as of the accumulated DMD.

On the other hand, in the case of the coupling amount of −30 dB/m or more, the impulse response shape is a Gaussian shape. It is well known that in a case that the inter-mode coupling is strong, the impulse response shape is a Gaussian shape. In the case of −20 dB/km, it can be seen that the Gaussian shape is similarly obtained, but a width thereof is further smaller.

Figure 8:
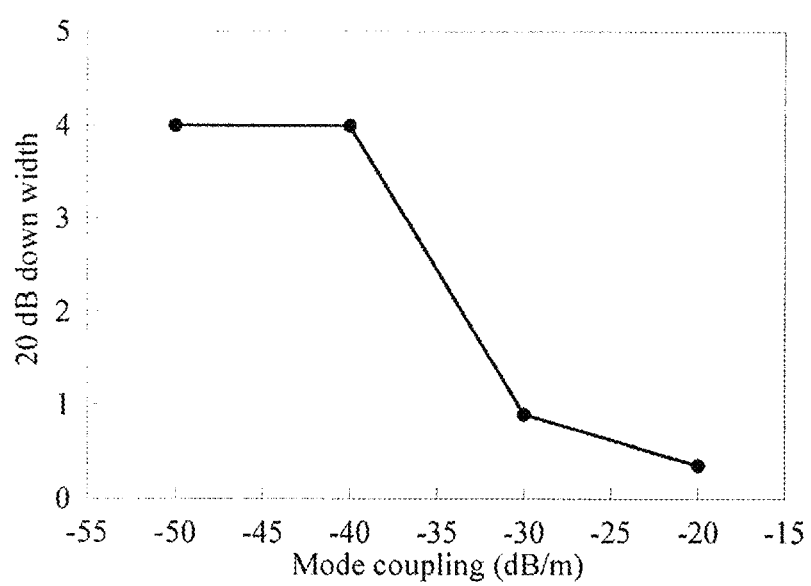
FIG. 8 is a diagram illustrating a relationship between the amount of inter-mode coupling and an impulse response 20 dB down width.

FIG. 8 illustrates the amount of inter-mode coupling and an impulse response 20 dB down width that are calculated. As described in the above calculation, the advantageous reduction effect of the impulse response width is observed over the coupling amount of −30 dB/m or more.

According to NPL 12, if the impulse response shape is a Gaussian shape, the impulse response width thereof is proportional to a square root of the distance, which is advantageous in that the impulse response width can be reduced particularly in a long distance transmission as compared to an uncoupled fiber that is proportional to the distance.

As described above, it can be thought that the random coupling occurs in the region of −30 dB/m or more where a significant reduction effect of the impulse response width is obtained.

Fourth Embodiment

In a case of, for each core of the multi-core optical fiber, satisfying the optical characteristics of G.652 that is the general single-mode fiber standard recommended in ITU-T, for example, a cut-off wavelength should be 1.26 μm or less, a bending loss should be 0.1 dB/100 turn or less at a wavelength of 1625 nm and a bend radius of 30 mm, and a mode field diameter should be 8.2 to 9.6 μm at a wavelength of 1310 nm.

Figure 9:
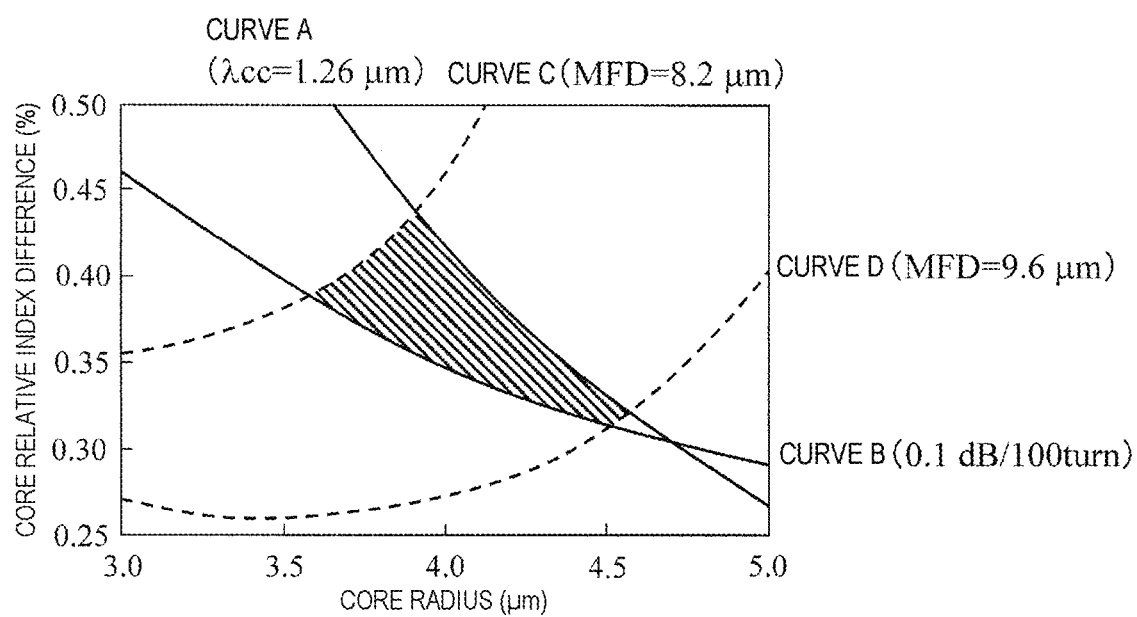
FIG. 9 is a diagram illustrating a core configuration design region satisfying optical characteristics of ITU-T G.652.

FIG. 9 is a diagram illustrating core configuration conditions for each core of the multi-core optical fiber to comply with G.652 (the horizontal axis represents a core radius and the vertical axis represents a relative index difference of the core). A region of the cut-off wavelength of 1.26 μm or less is below a curve A. A region of the bending loss of 0.1 dB/100 turn or less is above a curve B. A region of the mode field diameter of 8.2 to 9.6 μm is between a curve C and a curve D. Specifically, if the core configuration of the multi-core optical fiber corresponds to a hatched region, the multi-core optical fiber satisfies the characteristics of G.652 and a coupling type MCF core capable of using wavelength bands from the O-band to the L-band can be attained.

By designing the multi-core optical fiber that has the core configuration corresponding to the hatched region in FIG. 9 and has the core interval satisfying the conditions described in the first and second embodiments, the coupling type multi-core optical fiber can be obtained that is for transmission using the desired wavelength band and has the optical characteristics complying with the international standard. In other words, the present invention can provide the coupling type multi-core optical fiber and the design method thereof, the coupling type multi-core optical fiber having the optical characteristics complying with the international standard in the desired wavelength band that has not been clear.

OTHER EMBODIMENTS

Figure 10:
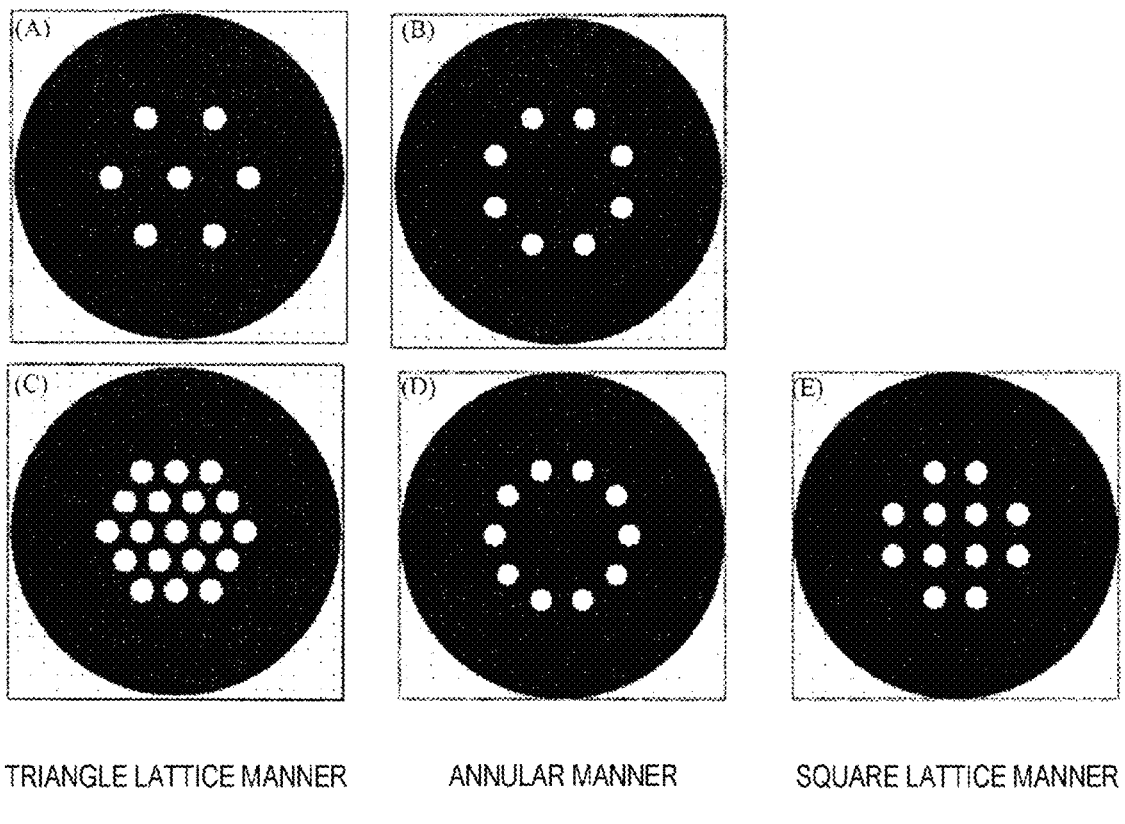
FIG. 10 is a diagram illustrating an example of a core arrangement of the multi-core optical fiber.

Conceivable examples of a core arrangement of the multi-core optical fiber include a square lattice manner, a hexagonal close-packed structure, an annular manner, and the like with 2 to 19 cores, for example, as illustrated in FIG. 10. In this case, the number of lengths between adjacent cores is plural, and the shortest length of the lengths is used as $\Lambda$.

Figure 13:
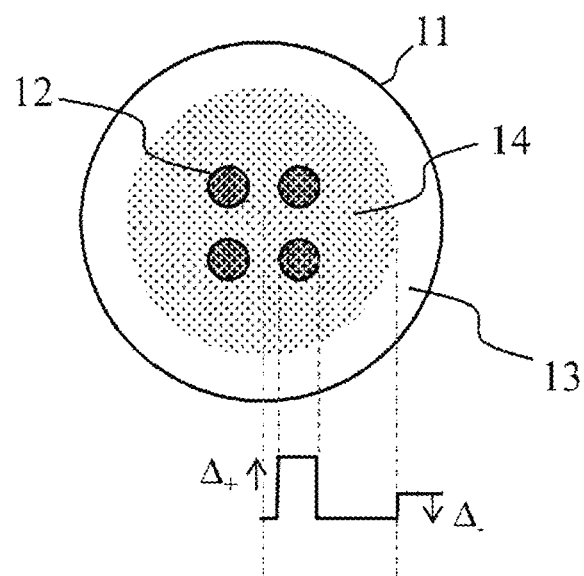
FIG. 13 is a diagram illustrating a multi-core optical fiber having a trench structure.

The present invention can achieve also a multi-core optical fiber having a trench structure in which a low refractive index clad 14 is present to surround step type cores 12 as illustrated in FIG. 13. In a case of the multi-core optical fiber having the trench structure, when a relative index difference of the core with respect to a clad 13 is $\Delta_+$ and a relative index difference of the low refractive index clad 14 with respect to the clad 13 is $\Delta_-$ the low refractive index clad 14 is treated as an effective clad for each of the cores 12. Therefore, it is only required that $\Delta$ described above be replaced with $$\Delta = \Delta_+ + |\Delta_-|$$

where $\Delta$ represents the relative index difference of the low refractive index clad 14 from the clad 13. Since the low refractive index means that the value is negative, $\Delta$ described above is obtained by adding an absolute value of $\Delta_-$ to $\Delta_+$.

INDUSTRIAL APPLICABILITY

The multi-core optical fiber according to the present invention can be used as a transmission medium in an optical transmission system. For example, an optical cable for the optical transmission system includes the multi-core optical fiber described in the above embodiments and a sheath covering the multi-core optical fiber with the twist pitch of 500 mm or less.

REFERENCE SIGNS LIST

11: Multi-core optical fiber
12: Core
13: Clad
14: Low refractive region

The invention claimed is:
1. A multi-core optical fiber, comprising
two or more cores,
wherein each of the cores has one propagation mode in a wavelength $\lambda$ of a desired communication wavelength band,
an inter-mode coupling coefficient $\kappa$ between adjacent cores which is a minimum interval among the cores is $\kappa_{min}$ or more and $\kappa_{max}$ or less,
where $\kappa_{min}=0.73$ m$^{-1}$ and $\kappa_{max}=120$ m$^{-1}$, and
the inter-mode coupling coefficient $\kappa$ is defined under the following conditions:
a bend radius of the multi-core optical fiber is 140 mm;
a twisting rate of the multi-core optical fiber is 4 $\pi$rad/m or more;
the wavelength $\lambda$ is 1550 nm; and
a normalized frequency V is varied in a range of 2 to 2.3.
2. The multi-core optical fiber according to claim 1, wherein $\kappa_{min}=2.2$ m$^{-1}$ and $\kappa_{max}=98$ m$^{-1}$.
3. The multi-core optical fiber according to claim 1, wherein $\kappa_{min}=7.3$ m$^{-1}$ and $\kappa_{max}=77.1$ m$^{-1}$.
4. The multi-core optical fiber according to claim 1, wherein a minimum core interval A that is an interval between the adjacent cores is in a range satisfying Math. C1,

[Math. C1]

$$\frac{a}{B}\ln\left(\frac{\kappa_{min}a}{A\sqrt{\Delta}}\right) > \Lambda > \frac{a}{B}\ln\left(\frac{\kappa_{max}a}{A\sqrt{\Delta}}\right)$$

$$A = -8.7812 + 5.51V \quad \text{(C1)}$$
$$B = 1.0027 - 1.188V$$
$$V = a\frac{2\pi}{\lambda}n_1\sqrt{2\Delta}$$

where a represents a radius of the cores, $\Delta$ represents a relative index difference of the cores and, $n_1$ represents a refractive index of the cores.
5. The multi-core optical fiber according to claim 1, wherein a cut-off wavelength is 1.26 um or less, a bending loss is 0.1 dB/100 turn or less at a wavelength of 1625 nm and a bend radius of 30 mm, and a mode field diameter is 8.2 um or more and 9.6 um or less at a wavelength of 1310 nm.
6. The multi-core optical fiber according to claim 1, wherein a value of the normalized frequency V is varied by changing parameters in the following equations:

$$V^2 = u^2 + w^2;$$

$$u = a\sqrt{(K^2 n_1^2 - \beta^2)}; \text{ and}$$

$$w = a\sqrt{(\beta_2 - K^2 n_0^2)},$$

where u is a normalized lateral propagation constant, w is a normalized lateral attenuation constant, a is a radius of the core, K is $2\pi/\lambda$, $n_1$ is a refractive index of the cores, $\beta$ is a propagation constant of a propagation mode, and $n_0$ is a refractive index of a clad.

* * * * *